(No Model.)

G. L. FOOTE.
GALVANIC BATTERY.

No. 489,559. Patented Jan. 10, 1893.

WITNESSES:

INVENTOR
George L. Foote
BY
ATTORNEY.

UNITED STATES PATENT OFFICE.

GEORGE L. FOOTE, OF BROOKLYN, NEW YORK.

GALVANIC BATTERY.

SPECIFICATION forming part of Letters Patent No. 489,559, dated January 10, 1893.

Application filed September 13, 1892. Serial No. 445,774. (No model.)

*To all whom it may concern:*

Be it known that I, GEORGE L. FOOTE, a citizen of the United States, residing at Brooklyn, in the county of Kings and State of New York, have invented certain new and useful Improvements in Galvanic Batteries, of which the following is a full, clear, and exact description.

This invention relates to electric batteries and has special reference to the type known as gravity batteries. In this type of battery a negative copper electrode and a zinc positive electrode are used. The copper electrode is placed at or near the bottom of the cell and embedded in the crystals of sulphate of copper or blue stone. The zinc electrode is located in the upper part of the cell, and is usually supported in place by a lug or lugs cast integrally with the zinc and provided with hooks which rest upon the edges of the containing vessel. This method of supporting the zinc is objectionable because of the large amount of zinc necessary to impart strength to the lug and make it long enough to properly locate the zinc in the cell. In the practical operation of these batteries, also, it has been found, that the copper works out of the crystals and often assumes a distorted position; this alters the internal resistance of the battery and renders its action variable. Another defect of these batteries is the deposition of oxide of zinc on the under side of the zinc element.

It is the object of my invention to provide a method of supporting the zinc element in the cell, which will lessen the cost of the same and decrease the waste; to provide a construction whereby the copper is at all times in its proper or normal position at the bottom of the cell; to provide means for removing the deposits of oxide of zinc from the under side of the zinc element; and means whereby the position of the zinc element may be adjusted to alter the internal resistance for purposes which will hereinafter appear.

The invention consists of the construction and combinations hereinafter set forth and claimed.

Figure 1:
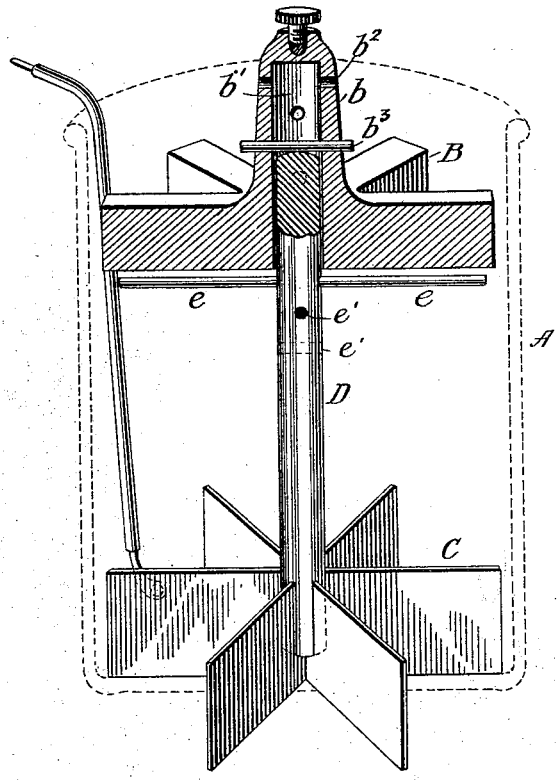
Figure 3:
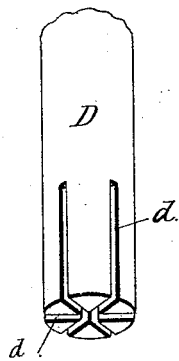
Figure 2:
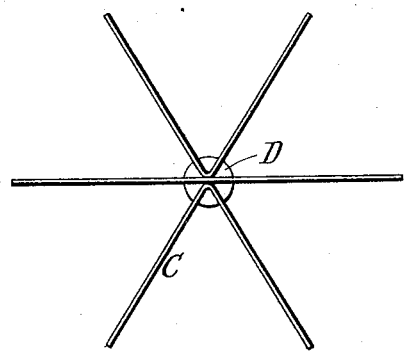

Referring to the accompanying drawings, Figure 1 is a view partially in perspective and partially in section of a battery cell constructed in accordance with my invention; Fig. 2 is a plan of the copper electrode, and Fig. 3 is a detail perspective of the lower end of the supporting post hereinafter referred to.

Referring to the drawings by letter, A represents in dotted lines the containing jar or vessel of a battery cell. In this are shown a zinc element B, and a copper element C. The copper element is made up of a number of plates of copper radiating from a common center in the usual manner. It rests upon or near the bottom of the cell in a horizontal position and is usually surrounded by crystals of sulphate of copper which are not shown in the drawings.

D represents a post standing vertically in the center of the cell. It is preferably made of wood which, if desired, may be saturated with paraffine, asphaltum or other suitable material to prevent the solution of the cell from entering its pores. The post may be of porcelain, glass, hard rubber, or any other non-conducting material. The lower end of this post is provided with saw kerfs or slots $d$, corresponding in number to the plates of the copper electrode C. These kerfs cross each other on the axis of the post, and they are of such a size that when the post is forced down over the center of the copper electrode the plates of the electrode will be held with sufficient friction to hold the post in place. The depth of the kerfs $d$ may be such as to allow the post to embrace the entire width of the copper plates and rest upon the bottom of the cell, or, they may be more shallow so that the post will rest upon the upper edges of and be sustained by the copper plates.

The zinc electrode is preferably made in the shape of a star or wheel; it is provided with a central upward projection or lug $b$, at the upper end of which is located a thumb screw and opening for a wire connection of the usual form. A cylindrical chamber $b'$ is formed in the center of the zinc and extends upward nearly to the top of the lug $b$. It is open on the under side of the zinc and is of a slightly greater diameter than the post D. The upper end of the post projects into this chamber and supports the zinc in a central position in the upper part of the cell. The walls of the chamber are provided with perforations $b^2$ at various points through which a pin $b^3$ may be passed against which the upper end of the post will rest when the zinc is in position. The height of the zinc in the cell may be changed by altering the position of this pin and allowing the top of the post to project more or less into the chamber $b'$. This adjustable feature of the zinc is important for what is known in the telegraphic service as "main line" batteries. In these batteries it is necessary to maintain the internal resistance of the cell and be able to alter the resistance as conditions change. It is obvious that by lowering the zinc the internal resistance will be decreased.

For local batteries and ordinary purposes, it is not necessary that the height of the zinc should be adjustable, and zincs for such batteries will have a medium sized chamber $b'$ and the holes $b^2$ and pin $b^3$ are dispensed with. The lug $b$ will ordinarily contain a much less quantity of zinc than the connecting lug or lugs of the ordinary zinc. It will, externally, be nearly if not quite as large as the ordinary lug, but as it is hollow, the amount of metal will be much less. The strength of the lug will be ample on account of being in the form of a tube and thereby having more strength than the same amount of metal shaped as a solid lug. It is observed that the weight of the zinc, bearing upon the rod, will be sufficient to prevent the displacement of the copper electrode by ordinary causes, and as the diameter of the zinc will be such as to neatly fit the interior of the cell the two elements will be prevented from tipping to an angular position.

$e$ represents an arm of any suitable material passing through the perforation or otherwise attached at right angles to the post D, at a point just below the zinc. The purpose of this is to remove deposits of oxide of zinc which may be made on the under side of the zinc electrode. This arm extends in both directions across the diameter of the zinc element and by grasping the lug $b$ between the fingers and twisting it a half turn, the formations of oxide are forced against the stationary arm and thereby broken or scraped off. Where an adjustable zinc is used the post will be provided with perforations $e'$ at various points, so that the position of the arm may be changed to correspond with the position of the zinc.

My invention, obviously, is not confined to the particular manner herein described of connecting the post with the two elements of the battery. A ring or socket may be provided at the center of the copper element in which the post may rest, or a pin may be attached to the copper which will project into a cavity in the lower end of the post. The upper end of the post may rest in a socket formed in a downward projection from the zinc instead of the upward projection described.

Having thus described my invention, I claim:

1. The combination of a battery electrode in the form of plates connected together and resting on edge, a second electrode provided with a socket or cavity and a post provided with slots or kerfs at one end, adapted to fit over said plates and its other end adapted to enter the said socket or cavity, substantially as described.

2. In a galvanic battery, the combination of an electrode and a post supporting the same from below, the electrode provided with a chamber into which the post projects and means for adjusting the distance which the post shall project into said chamber for the purpose set forth.

3. In a gravity battery, the combination of a rotatable zinc electrode and a stationary scraping device arranged below the same for the purpose set forth.

4. The combination with the stationary post carrying the scraping arm, of a zinc electrode pivoted on the post above the scraping device.

5. In a galvanic battery, the combination of two electrodes and a non-conducting post, the electrodes being arranged one above the other, the upper electrode being supported by the post and the lower electrode being held in position by the post, substantially as described.

6. In a galvanic battery, the combination of two electrodes and a non-conducting post, the extremities of the post being mechanically connected to the respective electrodes, for the purpose set forth.

In testimony whereof I subscribe my signature in presence of two witnesses.

GEORGE L. FOOTE.

Witnesses:
WM. A. ROSENBAUM,
FRANK S. OBER.